UNITED STATES PATENT OFFICE.

PATRICK HENRY O'KEEFFE, OF RAMORNIE, SOUTH GRAFTON, NEW SOUTH WALES, AUSTRALIA.

METHOD OF PRESERVING MEAT.

No. 822,548.  Specification of Letters Patent.  Patented June 5, 1906.

Application filed July 11, 1905. Serial No. 269,259.

*To all whom it may concern:*

Be it known that I, PATRICK HENRY O'KEEFFE, a subject of the King of Great Britain, residing at Ramornie, South Grafton, in the State of New South Wales, Commonwealth of Australia, have invented certain new and useful Improvements in the Method of Preserving Meats, of which the following is a specification.

Heretofore it has been impossible to pickle or corn cooked meat, because the pickling ingredients when held in solution in water alone will not penetrate such meat.

The object of my invention is to prepare a solution that will act as a vehicle to cause the ordinary and well-known pickling ingredients when mixed with it to thoroughly impregnate cooked meats.

The great practical advantage of pickling cooked meats is to permit meat to be parboiled for the purpose of first obtaining what is known as meat extract, and such parboiled meat can afterward be pickled and canned.

Heretofore the process of corning or pickling raw meat required some three or four weeks, the process being carried on in a cool chamber. Then the corned meat was parboiled for the purpose of preserving it for canning. The corning destroys the extracts, owing to the pickling ingredients in the meat.

By the use of my solution it is not only possible to corn cooked or parboiled beef, but the time heretofore required for corning raw meat is greatly reduced. Raw meat may be pickled in my solution in from two and a half hours, according to the density of color and amount of flavors required.

The quantity of meat necessary for making my solution is very small in proportion to the quantity of meat the solution will pickle.

One of the essentail features of my invention is in obtaining the meat-juices, which are treated as hereinafter described and termed in the finished state the "stock solution."

In preparing the stock solution the following process is carried out, and it has been found that the following proportions give the best results, viz: About six or eight pounds of raw meat is soaked for about eight hours in four gallons of cold water. Then the meat is removed from the water, which has now extracted certain juices and properties from the meat soaked therein, and to this solution add one pound of saltpeter. Boil the six or eight pounds of meat removed from the solution in some fresh water for about five minutes. Then put this parboiled meat back into the solution, and there allow it to soak for thirteen hours. The cooked meat assists to ripen the solution. The meat is then removed, and the resultant solution is brought to a boiling-point, then cooled and strained, preferably through a fine cloth. I have now obtained a stock solution, to which is added any well-known pickling ingredients, such as salt, saltpeter, spices, sugar, &c. This stock solution with the pickling ingredients added is used in a cold undiluted state, and a piece of raw meat soaked therein will be pickled in from two and a half hours or longer, according to the density of color and amount of flavor desired. It will be found that this stock solution will have caused the pickling ingredients to thoroughly impregnate the meat in this short time.

The meat after being used for the purpose of obtaining the stock solution is not wasted, but can be used for food, either canned or in any other way.

The boiling of meat draws out certain juices and properties, which are saved and utilized.

Raw meat may be corned by boiling it in a solution composed of one part stock solution to sixteen parts of water to which the solid ingredients of any pickling-recipe have been added.

In meat-preserving works raw meat can either be parboiled for five minutes in stock solution, diluted or not, to which pickling ingredients have been added, as above stated, or where the process of making meat extracts is carried on raw meat can be first parboiled or scalded the usual time to extract the juices in the usual manner, and then this parboiled or scalded meat may be further boiled in undiluted or diluted stock solution with the pickling ingredients and be thoroughly corned in a very short time. No special vessels, utensils, or machinery other than those in general use in meat-preserving processes are required.

I claim—

1. The method of preserving meat consisting in soaking meat in cold water for a predetermined period, removing the meat from said water, adding saltpeter to the latter, boiling the meat after removal, soaking the boiled meat in the water-and-saltpeter solution, removing the soaked meat, boiling said solution, cooling the latter, adding solid pickling ingredients to the cooled solution and soaking meat to be preserved in the resultant solution.

2. The method of preserving meat consisting in soaking meat in cold water for a predetermined period, removing the meat from said water, adding saltpeter to the latter, boiling the meat after removal in fresh water, soaking the boiled meat in the water-and-saltpeter solution, removing the soaked meat from the solution, boiling said solution, cooling the latter, adding salt, sugar and spices to the cooled solution, and soaking cooked meat to be preserved in the resultant solution.

3. The method of preserving meat consisting in soaking meat in cold water for a predetermined period, removing the meat from said water, adding saltpeter to the latter, boiling the meat after removal in fresh water, soaking the boiled meat in the water-and-saltpeter solution, removing the meat after being soaked a predetermined period, boiling the solution, cooling and straining the latter, adding solid pickling ingredients to the strained solution, diluting the latter with water, and boiling meat to be preserved in the diluted solution.

In testimony whereof I have signed my name to this specification in the presence of two subscribing witnesses.

PATRICK HENRY O'KEEFFE.

Witnesses:
W. TRIETSCH,
PETER TRIETSCH.